(12) United States Patent
Altintas et al.

(10) Patent No.: US 10,587,998 B2
(45) Date of Patent: Mar. 10, 2020

(54) MANAGED SELECTION OF A GEOGRAPHICAL LOCATION FOR A MICRO-VEHICULAR CLOUD

(71) Applicant: TOYOTA JIDOSHA KABUSHIKI KAISHA, Toyota-shi, Aichi-ken (JP)

(72) Inventors: Onur Altintas, Mountain View, CA (US); Takamasa Higuchi, Tokyo (JP); Falko Dressler, Mountain View, CA (US)

(*) Notice: Subject to any disclaimer, the term of this patent is extended or adjusted under 35 U.S.C. 154(b) by 79 days.

(21) Appl. No.: 15/845,945

(22) Filed: Dec. 18, 2017

(65) Prior Publication Data

US 2019/0191265 A1    Jun. 20, 2019

(51) Int. Cl.
*H04W 4/70* (2018.01)
*H04L 29/08* (2006.01)

(52) U.S. Cl.
CPC .............. *H04W 4/70* (2018.02); *H04L 67/10* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 2013/0054050 | A1* | 2/2013 | Filev | B60W 50/0097 701/2 |
| 2013/0124669 | A1* | 5/2013 | Anderson | G06F 11/3006 709/217 |
| 2013/0304863 | A1* | 11/2013 | Reber | G06F 1/3203 709/218 |
| 2014/0278047 | A1* | 9/2014 | Bahl | G08G 1/164 701/301 |
| 2016/0358479 | A1* | 12/2016 | Riedelsheimer | H04L 67/12 |
| 2017/0305437 | A1* | 10/2017 | Onorato | B60W 50/0098 |
| 2017/0365170 | A1* | 12/2017 | Lazic | B62D 15/0285 |
| 2018/0074855 | A1* | 3/2018 | Kambatla | G06F 9/505 |
| 2018/0241810 | A1* | 8/2018 | Lerzer | H04L 67/1008 |
| 2018/0260251 | A1* | 9/2018 | Beveridge | G06F 9/5027 |
| 2019/0011925 | A1* | 1/2019 | Bansal | G05D 1/0214 |
| 2019/0120964 | A1* | 4/2019 | Luo | G01S 17/89 |

* cited by examiner

*Primary Examiner* — Kodzovi Acolatse
(74) *Attorney, Agent, or Firm* — Burbage Law, P.C.; Jon-Michael Burbage; Elizabeth Ruzich

(57) ABSTRACT

The disclosure includes embodiments for controlling whether a particular connected vehicle forms a micro-vehicular cloud at a geographic location. In some embodiments, a method includes receiving a plurality of instances of resource data from a plurality of connected vehicles. The plurality of instances of resource data describe unused computing resources of the plurality of connected vehicles while present at the geographic location. The method includes analyzing the plurality of instances of resource data to determine rules data describing whether a micro-vehicular cloud should be formed at the geographic location. The method includes transmitting the rules data to the particular connected vehicle. The rules data is operable to control whether the particular connected vehicle forms a micro-vehicular cloud at the geographic location. In some embodiments, the method includes determining whether a particular connected vehicle forms a micro-vehicular cloud at a geographic location based on a current time.

21 Claims, 14 Drawing Sheets

BSM DATA 795

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 7A

BSM DATA 795

Part 1
GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 7B

MANAGED SELECTION OF A GEOGRAPHICAL LOCATION FOR A MICRO-VEHICULAR CLOUD

BACKGROUND

The specification relates to managing a selection of a geographic location for a micro-vehicular cloud.

Connected vehicles form clusters of interconnected vehicles (e.g., via vehicle-to-everything, i.e., "V2X") that are located at a similar geographic location. Such clusters are known as "micro-vehicular clouds." The vehicles in the cluster make available their unused computing resources to the other members of the micro-vehicular cloud.

SUMMARY

A problem with micro-vehicular clouds is that computing resources for any particular micro-vehicular cloud become scarce if the micro-vehicular cloud has fewer members. For example, if it is not rush hour, then fewer connected vehicles are on the roadway and there are less candidate members for an established micro-vehicular cloud, and so, computing resources for this established micro-vehicular cloud are scarce.

Described herein are embodiments of a planner system that solves the problem of computing resources becoming scarce for micro-vehicular clouds at times when, and locations where, fewer connected vehicle are present on the roadway. In some embodiments, the planner system manages the generation of micro-vehicular clouds so that they are generated at geographic locations where computing resources are consistently available based on historical data for that geographic location.

One solution to the problem of computing resources becoming scarce for micro-vehicular clouds is to handoff data to another nearby micro-vehicular cloud if the amount of computing resources drops below a certain threshold. However, experimentation shows that this approach results in a significant amount of communication and context-switching overhead, and frequently requires falling back on expensive cellular networks which creates a significant monetary expense. By comparison, the embodiments of the planner system described herein do not have this communication overhead or monetary expense because cloud-to-cloud handoffs which utilize cellular networks are not needed by the embodiments of the planner system described herein.

In some embodiments, the planner system includes software installed in a processor-based non-vehicle node. For example, the planner system is an element of a roadside edge server or a cloud server. The planner system receives wireless messages from a set of connected vehicles including one or more instances of resource data. An instance of resource data includes digital data that describes a log of the unused computing resources for a particular connected vehicle at different times (e.g., the instance of resource data is time-stamped) and different geographic locations (e.g., the instance of resource data is geo-stamped).

In some embodiments, a geographical area (e.g. a state, a county, a city, etc.) is divided into one or more geographical regions. A geographical region includes a plurality of geographic locations. A geographic location is an area represented by a global positioning system ("GPS") coordinate. See, for example, FIG. 4. In some embodiments a geographic location describes a segment of a roadway (i.e., a "road segment") within a geographic region. In some embodiments, a geographic region is managed by a planner system, and the planner system is only responsible for one geographic region. The other geographic regions within a geographic area are managed by other planner systems such that a single planner system manages a single geographic region.

In some embodiments, a connected vehicle which provides the planner system with the resource data includes a cloud client. A cloud client includes software that determines the resource data for the connected vehicle and provides the resource data to the planner system via a wireless network.

In some embodiments, the planner system aggregates multiple instances of resource data received from a plurality of vehicles and forms a resource data set. The resource data set is an aggregation of a plurality of instances of resource data received from a plurality of vehicles over a period of time such that the resource data set represents a statistically valid sample for analyzing the traffic patterns and resource availability at different geographic locations for various different times. The period of time is an amount of time necessary for the resource data set to represent a statistically valid sample. For example, the period of time is one day, one week, one year, five years, or any other amount of time which is sufficient for the planner system to receive enough instances of resource data for the resource data set to represent a statistically valid sample.

In some embodiments, the planner system analyzes the resource data set and generates model data. The model data is digital data that describes an estimate of the computing resources that are available from the vehicles that are located at different geographic locations (e.g., road segments) at different times of day.

In some embodiments, the planner system analyzes the model data and determines rules data for different geographic locations and times of day. The rules data is digital data that describes an estimate of the available vehicular computing resources for different geographic locations and different times of day. In some embodiments, the rules data is organized as a table or some other searchable data structure. In some embodiments, the rules data describes the available vehicular computing resources based on two different variables: (1) geographic location within a particular geographic region; and (2) time of day.

In some embodiments, the planner system transmits the rules data to the cloud client of a connected vehicle via a wireless network. The cloud client stores the rules data in a memory of the connected vehicle for later use. The cloud client: (1) determines the current geographic location and time of day for the connected vehicle [e.g., based on the GPS data for the connected vehicle]; and (2) queries the rules data using this geographic location and time as an input to the rules data in order to determine the estimate of the vehicular computing resources available for this geographic location and time. For example, the GPS data includes a description of the connected vehicle's current geographic location and the current time of day. The rules data is indexed so that it is searchable based on a query that includes both geographic location and time. The rules data is further operable so that, responsive to this query, the rules data replies with a rule for the geographic location and time included in the query. The rule describes an indication of whether a micro-vehicular cloud should be formed at this particular geographic location and time of day.

For example, the rule describes either: (1) an estimate of the available vehicular computing resources for different geographic locations and times of day [i.e., "option 1"]; or (2) a simple "yes" or "no" regarding whether a micro-vehicular cloud should be formed at this particular geographic location and time of day [i.e., "option 2"]. If the rule is in accordance with option (1), then the cloud client then determines whether to form a micro-vehicular cloud with other vehicles based on this estimate. If the rule is in accordance with option (2), then the cloud client follows the rule when determining whether to form a micro-vehicular cloud with other vehicles.

In some embodiments, the planner system is operable to instruct the cloud client regarding which vehicle at a geographic location is in a better position to be the coordinator for a micro-vehicular cloud and which vehicles are members of the micro-vehicular cloud. A coordinator of a micro-vehicular cloud is the vehicle which (1) forms the micro-vehicular cloud or (2) manages how the computing resources of the micro-vehicular cloud are utilized by the members of the micro-vehicular cloud.

For example, if a member vehicle would like to store digital data using the resources of the micro-vehicular cloud, then the member vehicle transmits a request to store the digital data to the coordinator of the micro-vehicular cloud and the coordinator determines whether the digital data can be stored and, if so, where the digital data will be stored. In this example, the coordinator maintains a table or some other data system which enables the coordinator to know where each bit of data is stored within the micro-vehicular cloud and how much data remains available (i.e., unused) for each member of the micro-vehicular cloud, and as such, is available for use by the members of the micro-vehicular cloud.

In another example, a member vehicle would like to use the processing power of the micro-vehicular cloud to complete a computing task, and the member vehicle transmits a request to process digital data to the coordinator. The coordinator then determines whether the micro-vehicular cloud has adequate unused processing power to accommodate the request, and if so, the coordinator takes steps to accommodate the request.

Other examples of a coordinator are described in U.S. patent application Ser. No. 15/644,197 filed on Jul. 7, 2017 and entitled "Computation Service for Mobile Nodes in a Roadway Environment," the entirety of which is hereby incorporated by reference.

The embodiments of the planner system described herein overcomes the deficiencies of other solutions to the problem of computing resources becoming scarce for micro-vehicular clouds. For example, other solutions do not limit when micro-vehicular clouds are formed, and as a result, micro-vehicular clouds are frequently formed in geographic locations which cannot provide a consistent level of traffic which is needed to provide enough computing resources to consistently support the computing resources which are required to maintain the micro-vehicular clouds. Other solutions attempt to solve this problem by using cellular networks to achieve cloud-to-cloud handoffs of data which was being maintained by a particular micro-vehicular cloud when the computing resources for this particular micro-vehicular cloud drops below a certain threshold. However, using these cellular networks is expensive and not practical. By contrast, the embodiments of the planner system described herein does not require the use of any cellular networks in order to guarantee that data is not lost.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system including: a non-vehicle node including a communication unit which is operable to wirelessly receive a plurality of instances of resource data from a plurality of connected vehicles, where the plurality of instances of resource data describe unused computing resources of the plurality of connected vehicles while present at a geographic location; and a processor communicatively coupled to the communication unit, where the processor is operable to execute computer code that causes the processor to: analyze the plurality of instances of resource data to determine rules data describing whether a micro-vehicular cloud should be formed at the geographic location; and cause the communication unit to wirelessly transmit the rules data to a particular connected vehicle, where the rules data is operable to control whether the particular connected vehicle forms a micro-vehicular cloud at the geographic location based on a current time. Other embodiments of this aspect include corresponding computer systems, apparatus, and computer programs recorded on one or more computer storage devices, each configured to perform the actions of the methods.

Implementations may include one or more of the following features. The system where the non-vehicle node is an edge server. The system where the non-vehicle node is a cloud server. The system where the non-vehicle node is located in a geographic region that includes the geographic location. The system where the rules data describes an estimate of unused computing resources available at the geographic location at a plurality of different times. The system where the rules data describes an estimate of unused computing resources available at the geographic location at a plurality of different times and the rules data is operable to control whether the particular connected vehicle forms the micro-vehicular cloud at the geographic location based on a current time. The system where the particular connected vehicle includes an onboard unit having a cloud client that analyzes the rules data to determine whether to form the micro-vehicular cloud at the geographic location based on the current time. The system where the plurality of instances of resource data are transmitted via a 5.9 gigahertz band and the communication unit includes an electronic receiver which is operable to receive a plurality of wireless messages including the plurality of instances of resource data via the 5.9 gigahertz band. The system where the plurality of wireless messages are Dedicated Short Range Communication ("DSRC") messages. The system where the plurality of instances of resource data describes the geographic location of the plurality of connected vehicles with an accuracy of plus or minus 1.5 meters in all directions. Implementations of the described techniques may include hardware, a method or process, or computer software on a computer-accessible medium.

One general aspect includes a method for controlling whether a particular connected vehicle forms a micro-vehicular cloud at a geographic location based on a current time of the particular connected vehicle, the method including: receiving a plurality of instances of resource data from a plurality of connected vehicles, where the plurality of instances of resource data describe unused computing resources of the plurality of connected vehicles while present at the geographic location; analyzing the plurality of instances of resource data to determine rules data describing whether a micro-vehicular cloud should be formed at the geographic location; and transmitting the rules data to the particular connected vehicle, where the rules data is operable to control whether the particular connected vehicle forms a micro-vehicular cloud at the geographic location based on the current time. Other embodiments of this aspect include corresponding computer systems, apparatus, and computer programs recorded on one or more computer storage devices, each configured to perform the actions of the methods.

Implementations may include one or more of the following features. The method where the method is executed by an edge server. The method where the method is executed by a cloud server. The method where the rules data indicates that a micro-vehicular cloud should not be formed at the geographic location based on the current time and the particular connected vehicle does not form the micro-vehicular cloud responsive to the rules data. The method where the rules data describes an estimate of unused computing resources available at the geographic location at a plurality of different times. The method where the particular connected vehicle includes an onboard unit having a cloud client that analyzes the rules data to determine whether to form the micro-vehicular cloud at the geographic location based on the current time. Implementations of the described techniques may include hardware, a method or process, or computer software on a computer-accessible medium.

One general aspect includes a computer program product including a non-transitory memory storing computer-executable code that, when executed by a processor, cause the processor to: receive a plurality of instances of resource data from a plurality of connected vehicles, where the plurality of instances of resource data describe unused computing resources of the plurality of connected vehicles while present at a geographic location; analyze the plurality of instances of resource data to determine rules data describing whether a micro-vehicular cloud should be formed at the geographic location; and transmit the rules data to a particular connected vehicle, where the rules data is operable to control whether the particular connected vehicle forms a micro-vehicular cloud at the geographic location based on a current time for the particular connected vehicle. Other embodiments of this aspect include corresponding computer systems, apparatus, and computer programs recorded on one or more computer storage devices, each configured to perform the actions of the methods.

Implementations may include one or more of the following features. The computer program product where the processor is an element of an edge server. The computer program product where the processor is an element of a cloud server. The computer program product where the rules data indicates that a micro-vehicular cloud should not be formed at the geographic location based on the current time and the particular connected vehicle does not form the micro-vehicular cloud responsive to the rules data. The computer program product where the rules data describes an estimate of unused computing resources available at the geographic location at a plurality of different times. The computer program product where the particular connected vehicle includes an onboard unit having a cloud client that analyzes the rules data to determine whether to form the micro-vehicular cloud at the geographic location based on the current time. Implementations of the described techniques may include hardware, a method or process, or computer software on a computer-accessible medium.

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a DSRC-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter, and is operable to wirelessly send and receive DSRC messages on a band that is reserved for DSRC messages.

A DSRC message is a wireless message that is specially configured to be send and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a DSRC-compliant GPS unit is operable to identify, monitor and track its two-dimensional position within 1.5 meters, in all directions, of its actual position 68% of the time under an open sky.

BRIEF DESCRIPTION OF THE DRAWINGS

The disclosure is illustrated by way of example, and not by way of limitation in the figures of the accompanying drawings in which like reference numerals are used to refer to similar elements.

FIGS. 7A and 7B are block diagrams illustrating Basic Safety Message ("BSM") data according to some embodiments.

DETAILED DESCRIPTION

Figure 1A:
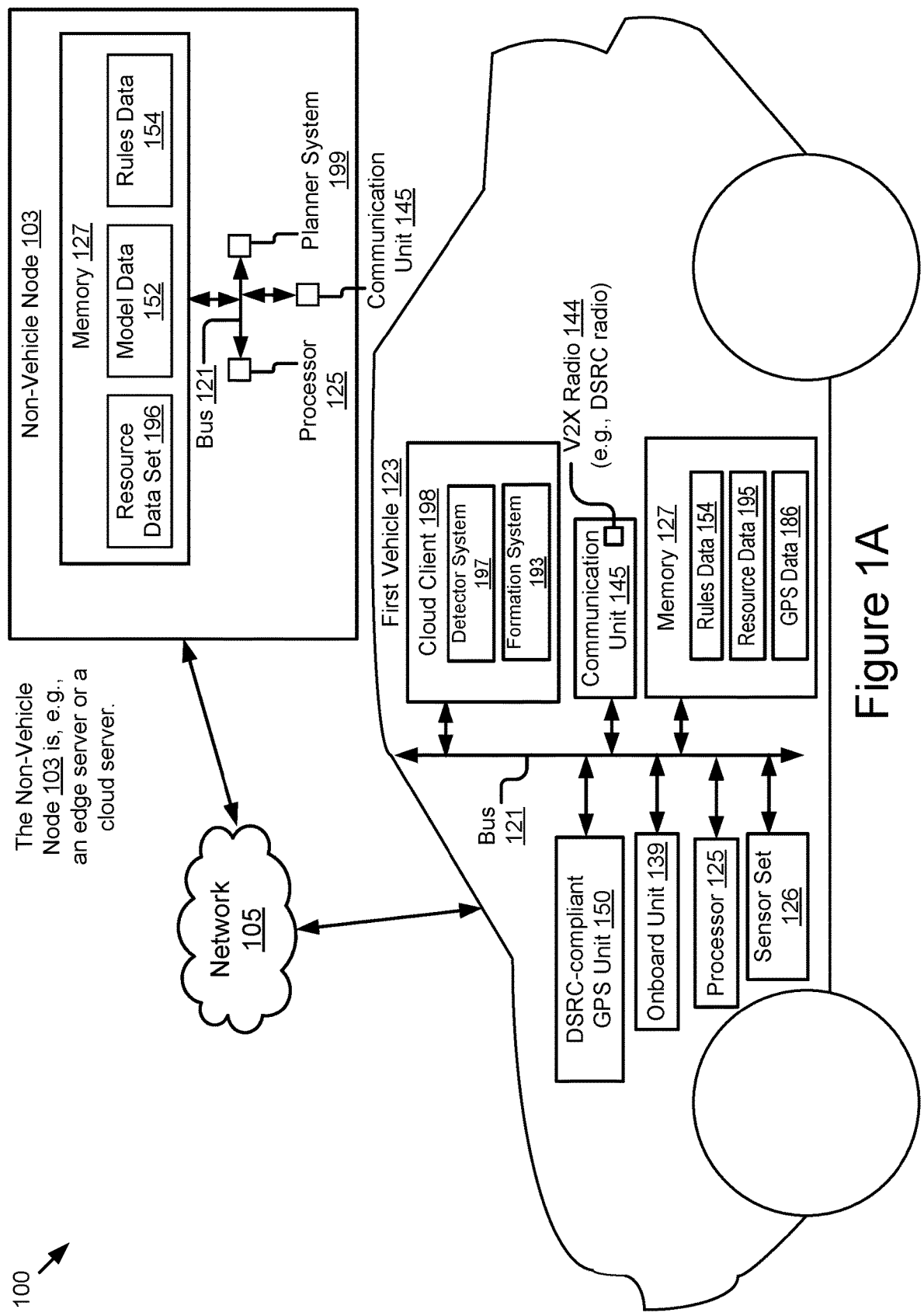
FIG. 1A is a block diagram illustrating an operating environment for a planner system according to some embodiments.

Referring now to FIG. 1A, depicted is a block diagram illustrating an operating environment 100 for a planner system 199 according to some embodiments. The operating environment 100 is present in a geographic region so that each of the elements of the operating environment 100 is present in the same geographic region.

The operating environment 100 may include one or more of the following elements: a first vehicle 123; and a non-vehicle node 103. These elements of the operating environment 100 may be communicatively coupled to one another via a network 105. These elements of the operating environment 100 are depicted by way of illustration. In practice, the operating environment 100 may include one or more first vehicles 123 and one or more non-vehicle nodes 103.

In the depicted embodiment, the first vehicle 123, and the non-vehicle node 103 include similar elements. For example, each of these elements of the operating environment 100 include their own bus 121, memory 127, communication unit 145 and processor 125. These elements of the first vehicle 123 and the non-vehicle node 103 provide the same or similar functionality relative to one another.

In the depicted embodiment, the first vehicle 123 and the non-vehicle node 103 each store different digital data. For example, the memory 127 of the first vehicle 123 stores digital data that is not exactly the same as the digital data stored by the memory 127 of the non-vehicle node 103. As depicted in the FIG. 1A, the resource data set 196 stored in the memory 127 of the non-vehicle node 103 includes the resource data 195 which is stored in the memory 127 of the first vehicle 123 since, for example, the cloud client 198 of the first vehicle 123 may cause the communication unit 145 of the first vehicle The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the first vehicle 123 is a DSRC-equipped vehicle and the non-vehicle node 103 is a DSRC-equipped device. For example, the first vehicle 123 includes a DSRC-compliant GPS unit 150 and a DSRC radio (e.g., the V2X radio 144 is a DSRC radio in embodiments where the first vehicle 123 is a DSRC-equipped vehicle) and the non-vehicle node 103 includes a communication unit 145 having a DSRC radio similar to the one included in the first vehicle 123. The network 105 may include a DSRC communication channel shared among the first vehicle 123 and a second vehicle.

The first vehicle 123 may include a car, a truck, a sports utility vehicle, a bus, a semi-truck, a drone or any other roadway-based conveyance. In some embodiments, the first vehicle 123 may include an autonomous vehicle or a semi-autonomous vehicle.

In some embodiments, the first vehicle 123 is a connected vehicle. For example, the first vehicle 123 is communicatively coupled to the network 105 and can send and receive messages via the network 105, and this quality may make the first vehicle 123 a "connected vehicle."

The non-vehicle node 103 is any processor-based computing device that is present in a roadway environment, includes the planner system 199 and is not a vehicle such as the first vehicle 123. In some embodiments, the non-vehicle node 103 is one of the following: an edge server; a cloud server; a smartphone; a laptop; a personal computer; a tablet computer; and a smart watch or some other smart device. The non-vehicle node 103 is communicatively coupled to the network 105 and can send and receive messages via the network 105.

The first vehicle 123 includes one or more of the following elements: a processor 125; a sensor set 126; a DSRC-compliant GPS unit 150; a communication unit 145; an onboard unit 139; a memory 127; and a planner system 199. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1A depicts a single processor 125 present in the first vehicle 123, multiple processors may be included in the first vehicle 123. The processor 125 may include a graphical processing unit. Other processors, operating systems, sensors, displays, and physical configurations may be possible.

In some embodiments, the processor 125 may be an element of a processor-based computing device of the first vehicle 123. For example, the first vehicle 123 may include one or more of the following processor-based computing devices and the processor 125 may be an element of one of these devices: an onboard vehicle computer; an electronic control unit; a navigation system; an advanced driver assistance system ("ADAS system") and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the cloud client 198. In some embodiments, the onboard unit 139 is the computer system 200 depicted in FIG. 2.

The sensor set 126 includes one or more onboard sensors. The sensor set 126 may collect the resource data 195. The resource data 195 may describe, for example, the unused computing resources of the first vehicle 123. For example, the first vehicle 123 includes: a processor 125; a memory 127; a communication unit 145; an onboard unit 139; a sensor set 126; and a DSRC-compliant GPS unit 150. At any given time, the first vehicle 123 is making use of some, but not all, of the processing power of the processor 125; the unused processing power of the processor 125 is an example of unused computing resources of the first vehicle 123. At any given time, the first vehicle 123 is making use of some, but not all, of the storage capacity of the memory 127; the unused storage capacity of the memory 127 is an example of unused computing resources of the first vehicle 123. At any given time, the first vehicle 123 is making use of some, but not all, of the wireless communication capacity of the communication unit 145; the unused wireless communication capacity of the communication unit 145 is an example of unused computing resources of the first vehicle 123. At any given time, the first vehicle 123 is making use of some, but not all, of the processing power, storage capacity or wireless communication capacity of the onboard unit 139; the processing power, storage capacity or wireless communication capacity of the onboard unit 139 are examples of unused computing resources of the first vehicle 123. At any given time, the first vehicle 123 is making use of some, but not all, of the sensing capacity of the sensor set 126; the unused sensing capacity of the sensor set 126 is an example of unused computing resources of the first vehicle 123. At any given time, the first vehicle 123 is making use of some, but not all, of the position localization capacity of the DSRC-compliant GPS unit 150; the unused position localization capacity of the DSRC-compliant GPS unit 150 is an example of unused computing resources of the first vehicle 123.

In some embodiments, one or more of the following elements include hardware, software or a combination of hardware and software which measure the unused computing resources of the first vehicle 123 and resource data 195 describing the unused computing resources of the first vehicle 123 to the cloud client 198: the processor 125; the memory 127; the communication unit 145; the onboard unit 139; the sensor set 126; and the DSRC-compliant GPS unit 150. This hardware, software or combination of hardware and software are elements of the sensor set 126.

In some embodiments, the resource data 195 is time-stamped. For example, the resource data 195 describes the unused computing resources of the first vehicle 123 at a particular point in time. In some embodiments, the resource data 195 is geo-stamped. For example, the resource data 195 describes the unused computing resources of the first vehicle 123 when the first vehicle 123 is present at a particular geographic location which is described by the GPS data 186.

In some embodiments, the sensor set 126 may include one or more sensors that are operable to measure the physical environment outside of the first vehicle 123. For example, the sensor set 126 may record one or more physical characteristics of the physical environment that is proximate to the first vehicle 123.

In some embodiments, the sensor set 126 may include one or more sensors that are operable to measure the physical environment inside a cabin of the first vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the DSRC-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data that describes one or more locations of a device (e.g., one or more of the first vehicle 123, the second vehicle 124 of the non-vehicle node 103) at one or more different times, images or other measurements of the roadway environment and objects or other vehicles present in the roadway environment such as pedestrians, animals, traffic signs, traffic lights, pot holes, etc.

The roadway environment may include a roadway region that is proximate to the first vehicle 123. For example, the first vehicle 123 may be in motion on a roadway and the roadway environment may include one or more vehicles that are in front of the first vehicle 123, behind the first vehicle 123, beside the first vehicle 123 or one or more car lengths away from the first vehicle 123. The sensor data may describe measurable aspects of the roadway environment.

In some embodiments, the sensor data may describe an event present in the roadway environment. The event may be any roadway condition that causes roadway congestion, is an indication of roadway congestion or is a result of roadway congestion. The event may also include an opening between two objects of the roadway environment which is big enough for a vehicle (e.g., the first vehicle 123) to enter or pass through without causing a collision or nearly causing a collision.

In some embodiments, the DSRC-compliant GPS unit 150 includes any hardware and software necessary to make the first vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data 186 describing the location of the first vehicle 123 with lane-level accuracy. For example, the first vehicle 123 is traveling in a lane of a multi-lane roadway. Lane-level accuracy means that the lane of the first vehicle 123 is described by the GPS data 186 so accurately that the first vehicle's 123 precise lane of travel may be accurately determined based on the GPS data 186 for this first vehicle 123 as provided by the DSRC-compliant GPS unit 150.

In some embodiments, in the context of the planner system 199 and the cloud client 198, lane-level accuracy enables the planner system 199 to more accurately determine rules data 154 for not only where the first vehicle 123 is currently located, but also where the first vehicle 123 is estimated to be located in the future based on the heading of the first vehicle's 123 lane of travel. For example, each lane of a roadway has one heading (e.g., north, south, east, west, etc.) and GPS data 186 having lane-level accuracy enables the planner system 199 to know the heading of the first vehicle 123. This information, combined with information describing the speed of the first vehicle 123 (which the planner system 199 will have using Basic Safety Messages if each of the non-vehicle node 103 and the first vehicle 123 are DSRC-enabled), enables the planner system 199 to accurately estimate a future location of the first vehicle 123 and select rules data 154 based in part on this estimated future location.

In some embodiments, the DSRC-compliant GPS unit 150 includes hardware that wirelessly communicates with a GPS satellite (or GPS server) to retrieve GPS data 186 that describes the geographic location of the first vehicle 123 with a precision that is compliant with the DSRC standard. The DSRC standard requires that GPS data 186 be precise enough to infer if two vehicles (one of which is, for example, the first vehicle 123) are located in adjacent lanes of travel on a roadway. In some embodiments, the DSRC-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data 186 is less than 1.5 meters the planner system 199 described herein may analyze the GPS data 186 provided by the DSRC-compliant GPS unit 150 and determine what lane the first vehicle 123 is traveling in based on the relative positions of two or more different vehicles (one of which is, for example, the first vehicle 123) traveling on a roadway at the same time.

By comparison to the DSRC-compliant GPS unit 150, a conventional GPS unit which is not compliant with the DSRC standard is unable to determine the location of a first vehicle 123 with lane-level accuracy. For example, a typical parking space is approximately 3 meters wide. However, a conventional GPS unit only has an accuracy of plus or minus 10 meters relative to the actual location of the first vehicle 123. As a result, such conventional GPS units are not sufficiently accurate enable the planner system 199 to determine the lane of travel of the first vehicle 123.

Figure 1B:
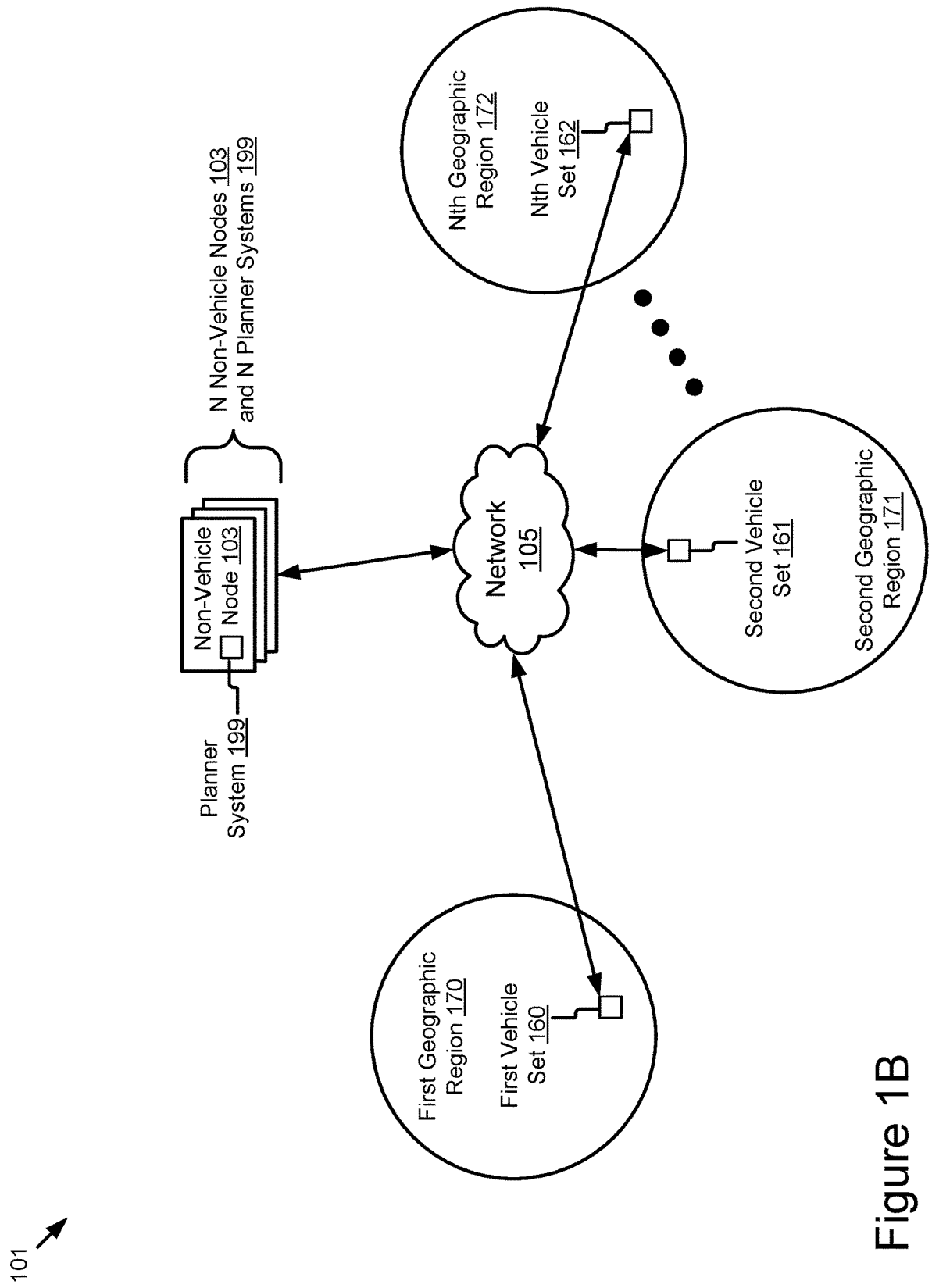
FIG. 1B is a block diagram illustrating a plurality of geographic regions managed by a plurality of planner systems according to some embodiments.
Figure 1C:
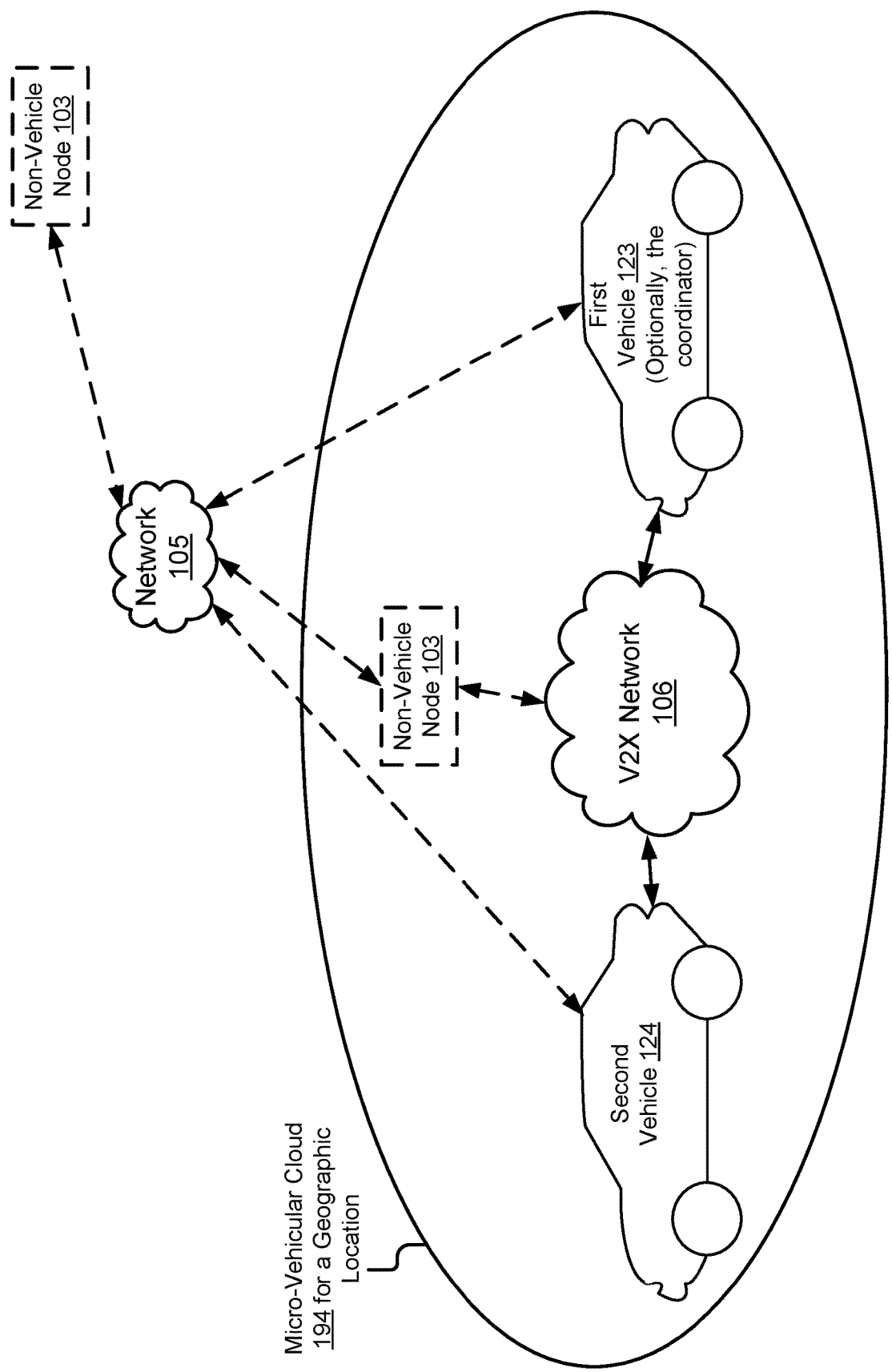
FIG. 1C is a block diagram illustrating micro-vehicular cloud according to some embodiments.

The communication unit 145 transmits and receives data to and from a network 105 or to another communication channel (e.g., the V2X network 106 depicted in FIG. 1C). In some embodiments, the communication unit 145 may include a DSRC transmitter, a DSRC receiver and other hardware or software necessary to make the first vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 144. The V2X radio 144 is a hardware unit that includes one or more transmitters and one or more receivers that is operable to send and receive any type of V2X message.

In some embodiments, the V2X radio 144 includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio 144 includes a non-transitory memory which stores digital data that controls the frequency for broadcasting Basic Safety Messages ("BSM message" if singular, "BSM messages" if plural). In some embodiments, the non-transitory memory stores a buffered version of the GPS data 186 for the first vehicle 123 so that the GPS data 186 for the first vehicle 123 is broadcast as an element of the BSM messages which are regularly broadcast by the V2X radio 144 (e.g., at an interval of once every 0.10 seconds). An example of the digital data that is included in a BSM message is depicted in FIGS. 7A and 7B.

In some embodiments, the V2X radio 144 includes any hardware or software which is necessary to make the first vehicle 123 compliant with the DSRC standards. In some embodiments, the DSRC-compliant GPS unit 150 is an element of the V2X radio 144.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the data described below with reference to FIGS. 1B-1F, 2, 3A-3C, 4, 5 and 6.

As depicted in FIG. 1A, the memory 127 stores the following digital data: the rules data 154; the resource data 195; and the GPS data 186.

The rules data 154 is digital data that describes information used by the cloud client 198 to determine whether to form a micro-vehicular cloud. In some embodiments, the rules data 154 is operable to control whether the cloud client 198 forms the micro-vehicular cloud. For example, the rules data 154 describes the estimated unused computing resources for a particular geographic location at a particular time of day (e.g., as described by the GPS data 186) and the minimum computing resources for forming a micro-vehicular cloud at this geographic location (and, optionally, at this time of day). The cloud client 198 analyzes the rules data 154 to determine whether the estimated unused computing resources meets or exceeds the minimum computing resources for forming the micro-vehicular cloud. If the minimum is met or exceeded, then the cloud client 198 forms the micro-vehicular cloud. If the minimum is not met or exceeded, then the cloud client 198 does not form the micro-vehicular cloud. An example of the rules data 154 is depicted in FIG. 1F according to some embodiments.

The GPS data 186 is digital data that describes a geographic location of the first vehicle 123. In some embodiments, the GPS data 186 also describes a time of day when the first vehicle 123 is present at the geographic location. In some embodiments, the GPS data 186 describes a geographic location of the first vehicle 123 with lane-level accuracy which is compliant with the DSRC standard.

The cloud client 198 includes code and routines that are operable to aggregate the resource data 195, transmit the resource data 195 to the receive the rules data 154, determine whether to form a micro-vehicular cloud based on the rules data 154 and, if the decision is made to form the micro-vehicular cloud, the take the steps to form the micro-vehicular cloud.

In some embodiments, the cloud client 198 is an element of the onboard unit 139 or some other onboard vehicle computer. The cloud client 198 includes a detector system 197 and a formation system 193. These elements of the cloud client 198 are now described.

The detector system 197 includes code and routines that are operable, when executed by a processor of the first vehicle 123 (e.g., the processor 125) or an onboard vehicle computer, to cause the processor or the onboard vehicle computer to execute one or more of the following steps: (1) continuously monitor the current geographical location of the first vehicle 123 and the current time of day; (2) form queries for the rules data 154, which is stored on the memory 127 of the first vehicle 123, where the queries include (i) the current geographical location of the first vehicle 123 and (ii) the current time of day; (3) receive, from the rules data 154, a response to the query that includes a rule for the current geographical location and the current time of day; and (4) pass the rule to the formation system 193.

The formation system 193 includes code and routines that are operable, when executed by a processor of the first vehicle 123 (e.g., the processor 125) or an onboard vehicle computer, to cause the processor or the onboard vehicle computer to: (1) receive the rule from the detector system 197; and (2) determine, based on the rule, whether to form a micro-vehicular cloud based on the rule. If the rule indicates that the micro-vehicular cloud should not be formed, then the formation system 193 does not form the micro-vehicular cloud. If the rule indicates that the micro-vehicular cloud should be formed, then the formation system 193 executes steps to form the micro-vehicular cloud.

As depicted, the non-vehicle node 103 includes the following elements: a memory 127; a bus 121; a processor 125; a communication unit 145; and a planner system 199. The following elements of the non-vehicle node 103 provide similar functionality as those described above for the first vehicle 123, and so, these descriptions will not be repeated here: the memory 127; the bus 121; the processor 125; and the communication unit 145.

The planner system 199 may include code and routines that are operable, when executed by the processor 125 of the non-vehicle node 103, to cause the processor 125 of the non-vehicle node 103 to execute one or more the following steps: (1) receive multiple instances of resource data 195 from a plurality of vehicles such as, and possibly including, the first vehicle 123; aggregate the resource data 195 to form the resource data set 196; (3) analyze the resource data set 196 to determine model data 152 which is digital data that describes an estimate (e.g., empirical model) of the unused computing resources that are available from the vehicles that are located at different geographic locations (i.e., road segments which are described by digital data such as the GPS data 186) at different times of day; (4) determines rules data 154 based on the model data 152, where the rules data 154 is digital data that describes an estimate of the available (i.e., unused) vehicular computing resources for different geographic locations and times of day; and (5) transmit the rules data 154 to the cloud client 198 via the network 105. The cloud client 198 stores the rules data 154 in a memory 127 of the first vehicle 123.

The functionality of the planner system 199 is described in more detail below with reference to FIGS. 1B-1F, 2, 3A-3C, 4-6, 7A and 7B.

The memory 127 of the non-vehicle node 103 includes the resource data set 196, the model data 152 and the rules data 154. These elements of the non-vehicle node 103 are described above, and so, these descriptions will not be repeated here.

In some embodiments, one or more of the first vehicle 123 and the non-vehicle node 103 may include a full-duplex coordination system as described in U.S. patent application Ser. No. 14/471,387 filed on Aug. 28, 2014 and entitled "Full-Duplex Coordination System." In this way, one or more of these elements of the operating environment 100 may transmit full-duplex wireless messages to one another. For example, any of the wireless messages described herein may be full-duplex wireless messages.

In some embodiments, one or more of the communication units 145 of the first vehicle 123 and the non-vehicle node 103 may include a mmWave communication transceiver and receiver. In this way, one or more of these elements of the operating environment 100 may transmit mmWave messages to one another. For example, any of the wireless messages described herein may be mmWave messages.

In some embodiments, the planner system 199 is implemented using hardware including a field-programmable gate array ("FPGA") or an application-specific integrated circuit ("ASIC"). In some other embodiments, the planner system 199 is implemented using a combination of hardware and software.

In some embodiments, the cloud client 198 is implemented using hardware including an FPGA or an ASIC. In some other embodiments, the cloud client 198 is implemented using a combination of hardware and software.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the planner system 199 and the cloud client 198 include encryption keys for encrypting wireless messages and decrypting the wireless messages described herein.

Referring now to FIG. 1B, depicted is a block diagram illustrating an operating environment 101 including a plurality of geographic regions managed by a plurality of planner systems according to some embodiments.

As depicted, the operating environment 101 includes the following elements: a plurality of non-vehicle nodes 103; a first geographic region 170; a second geographic region 171; and an Nth geographic region 172 (where "N" represents any positive whole number). The first geographic region 170 includes a first vehicle set 160. The second geographic region 171 includes a second vehicle set 161. The Nth geographic region 172 includes an Nth vehicle set 162. Each of the plurality of non-vehicle nodes 103 include a planner system 199 such that the operating environment 101 includes a plurality of planner systems 199.

The first vehicle set 160 includes one or more first vehicles 123. The second vehicle set 161 includes one or more first vehicles 123. The Nth vehicle set 162 includes one or more first vehicles 123.

In some embodiments, each planner system 199 manages at least one of the geographic regions. In some embodiments, each planner system 199 manages exactly one of the geographic regions. In some embodiments, each non-vehicle node 103 is communicatively coupled to the network 105, and each of the first vehicle set 160, the second vehicle set 161 and the Nth vehicle set 162 are communicatively coupled to the network 105. Accordingly, each planner system 199 is communicatively coupled to the first vehicles 123 included in the geographic region that is managed by each planner system 199.

Referring now to FIG. 1C, depicted is a block diagram illustrating a micro-vehicular cloud 194 according to some embodiments. As depicted, the micro-vehicular cloud 194 includes the first vehicle 123, the second vehicle 124, the non-vehicle node 103 and a vehicle-to-everything network 106 (herein, a "V2X" network 106) which is exclusively usable by the endpoints which are members of the micro-vehicular cloud 194.

In some embodiments, a member of the micro-vehicular cloud 194 includes any endpoint (e.g., the first vehicle 123, the second vehicle 124, the non-vehicle node 103, etc.) which has completed a process to join the micro-vehicular cloud 194 (e.g., a handshake process with the coordinator of the micro-vehicular cloud 194).

In some embodiments, the V2X network 106 includes DSRC or any other suitable wireless network such as those described above with reference to the network 105.

In some embodiments, the non-vehicle node 103 is not an element of the micro-vehicular cloud 194. Accordingly, this is why the non-vehicle node 103 is depicted with a dashed line in FIG. 1C to indicate that in some embodiments the non-vehicle node 103 is an element of the micro-vehicular cloud 194, whereas in other embodiments the non-vehicle node 103 is not an element of the micro-vehicular cloud 194. In other words, the non-vehicle node 103 may or may not be a member of the micro-vehicular cloud 194, and the non-vehicle node 103 is depicted twice in FIG. 1C, and using a dashed line, in order to depict these two embodiments.

The second vehicle 124 includes elements and functionality which are similar to those described above for the first vehicle 123 with reference to FIG. 1A, and so, those descriptions will not be repeated here. In some embodiments, the first vehicle 123 and the second vehicle 124 are members of a vehicle set such as the first vehicle set 160, the second vehicle set 161 or the Nth vehicle set 162 depicted in FIG. 1B. In some embodiments, the first vehicle 123 and the second vehicle 124 are located in a geographic region which is managed by the non-vehicle node 103.

In some embodiments, the micro-vehicular cloud 194 is stationary. In other words, in some embodiments the micro-vehicular cloud 194 is a "stationary micro-vehicular cloud." A stationary micro-vehicular cloud is a wireless network system in which a plurality of connected vehicles (such as the first vehicle 123 and the second vehicle 124), and optionally devices such as the non-vehicle node 103, form a cluster of interconnected vehicles that are located at a same geographic region. The connected vehicles are interconnected via Wi-Fi, mmWave, DSRC or some other form of V2X wireless communication. For example, the connected vehicles are interconnected via the V2X network 106. Vehicles (and devices such as the non-vehicle node 103) which are members of the same stationary micro-vehicular cloud make their unused computing resources available to the other members of the stationary micro-vehicular cloud.

In some embodiments, the micro-vehicular cloud 194 is "stationary" because the geographic location of the micro-vehicular cloud 194 is static; different vehicles constantly enter and exit the micro-vehicular cloud 194 over time. This means that the computing resources available within the micro-vehicular cloud 194 is variable based on the traffic patterns for the geographic location at different times of day: increased traffic corresponds to increased computing resources because more vehicles will be eligible to join the micro-vehicular cloud 194; and decreased traffic corresponds to decreased computing resources because less vehicles will be eligible to join the micro-vehicular cloud 194.

In some embodiments, the V2X network 106 is a non-infrastructure network. A non-infrastructure network is any conventional wireless network that does not include infrastructure such as cellular towers, servers or server farms. For example, the V2X network 106 specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124

Figure 1D:
FIG. 1D is a block diagram illustrating an example of resource data according to some embodiments.

Referring now to FIG. 1D, depicted is a block diagram illustrating an example of resource data 195 according to some embodiments. As depicted in FIG. 1D, the resource data 195 includes the following digital data: timestamp data 176; the GPS data 186; and availability data 174. In some embodiments, the resource data 195 includes BSM data 795 such as depicted in FIG. 7A or 7B.

The GPS data 186 describes a series of geographic locations for a connected vehicle which includes the cloud client 198 (e.g., the first vehicle 123 or the second vehicle 124).

In some embodiments, the GPS data 186 is digital data that describes the series of geographic locations with lane-level accuracy such that the heading of the connected vehicle while at each of the geographic locations is determinable based on the GPS data 186. Combined with velocity information included in the BSM data 795, the heading information which is determinable based on the GPS data 186 enables the future location of the connected vehicle at one or more different times.

The timestamp data 176 is associated with the GPS data 186. The timestamp data 176 is digital data that describes a series of times when the connected vehicle was at each of the series of geographic locations described by the GPS data 186.

The availability data 174 is associated with the GPS data 186 and the timestamp data 176. The availability data 174 is digital data that describes the unused computing resources for the connected vehicle when the connected vehicle for (1) each of the series of geographic locations described by the GPS data 186 and (2) each of the series of times described by the timestamp data 176.

Accordingly, the resource data 195 describes a series of geographic locations of the connected vehicle, the times when the connected vehicle was at these geographic locations and the unused computing resources of the connected vehicle at these times and geographic locations.

In some embodiments, the resource data 195 includes a 3-tuple recorded by the cloud client 198 at regular time intervals. For example, the 3-tuple is <t, p, r> where t is a timestamp, p is a geographic location of the connected vehicle including the cloud client 198 and r is a vector that describes the unused computing resources of the connected vehicle as recorded by the cloud client 198 at time t and geographic location p.

Figure 1E:
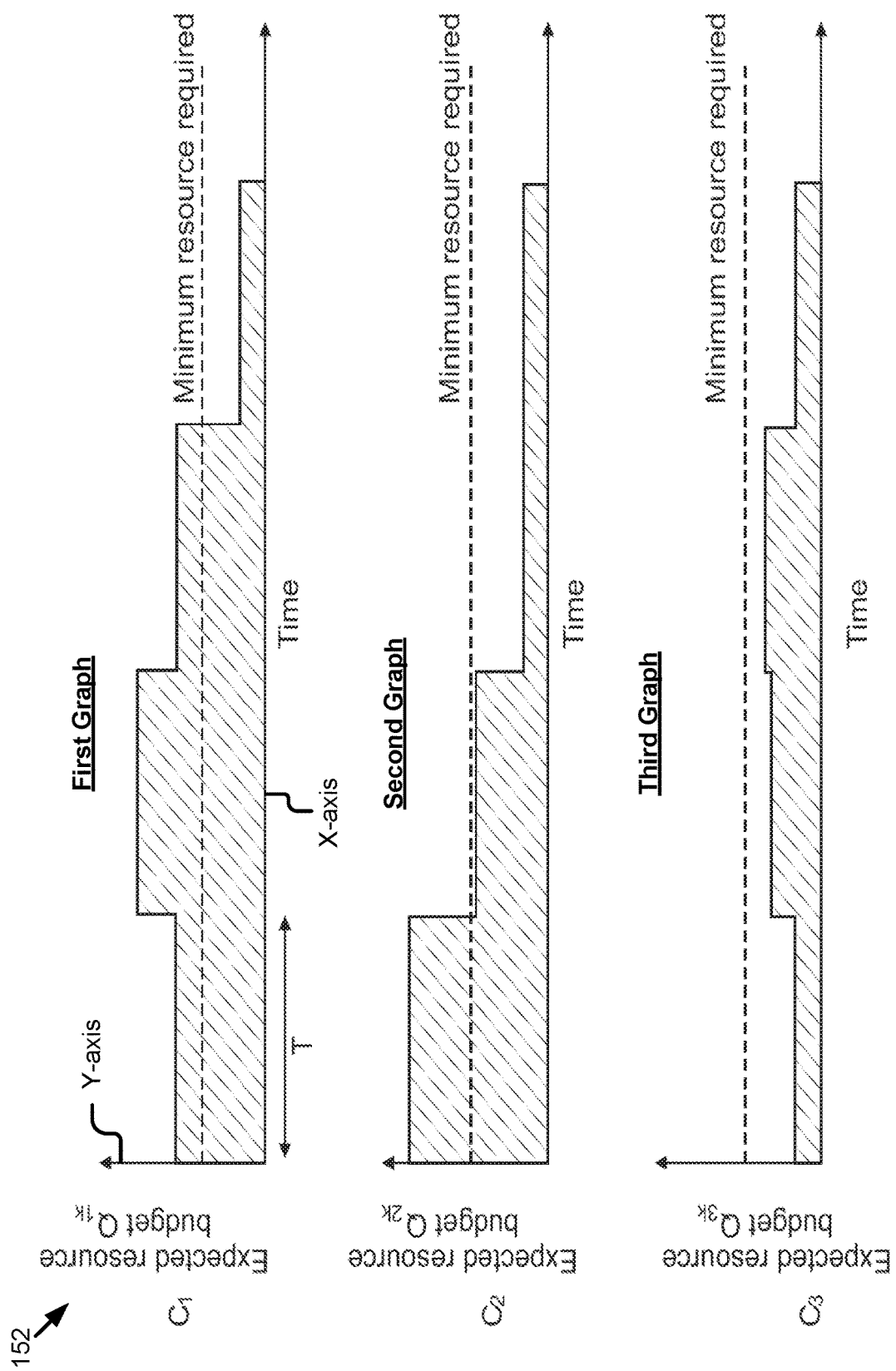
FIG. 1E is a block diagram illustrating model data for a plurality of geographic locations according to some embodiments.
Figure 1F:
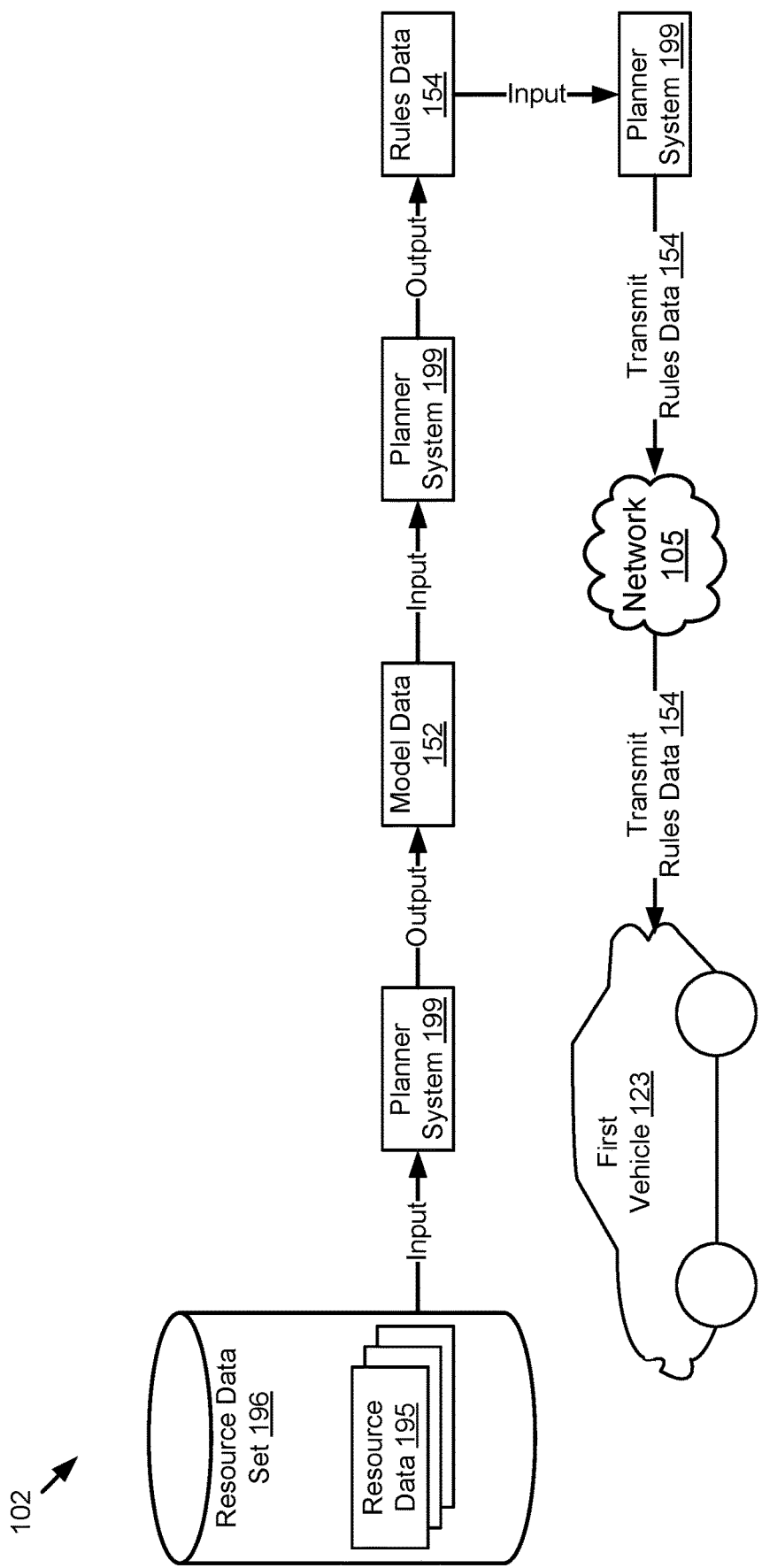
FIG. 1F is a block diagram illustrating a process flow executed by a planner system according to some embodiments.

Referring now to FIG. 1E, depicted is a block diagram illustrating model data 152 for a plurality of geographic locations according to some embodiments.

The model data 152 describes the expected resource budget, "Q," for three candidate geographic locations over a period of time, T. The three candidate geographic locations depicted in FIG. 1E include: (1) a first candidate geographic location, $C_1$; (2) a second candidate geographic location $C_2$; and (3) a third candidate geographic location $C_3$.

As used herein, a "resource budget" is a total amount of unused computing resources for a particular candidate geographic location.

As depicted, a first candidate geographic location has a resource budget $Q_{1k}$ represented by a Y-axis of a first graph that varies over a series of times, "T," represented by an X-axis of the first graph. The second candidate geographic location has a resource budget $Q_{2k}$ represented by a Y-axis of a second graph that varies over a series of times, "T," represented by an X-axis of the second graph. The third candidate geographic location has a resource budget $Q_{2k}$ represented by a Y-axis of a third graph that varies over a series of times, "T," represented by an X-axis of the third graph.

The first graph, second graph and third graph each also include a value indicating a minimum resource required. The minimum resource required is the minimum unused computing resources that are required for a micro-vehicular cloud to be formed for the candidate geographic location based on the resource data set 196 aggregated by the planner system 199.

The planner system 199 analyzes the model data 152 to generate rules data 154 describing a set of rules which control whether the cloud client 198 will form a micro-vehicular cloud based on its (1) geographic location; and (2) time of day.

For example, the rules data 154 is digital data that describes a set of rules. A rule describes either: (1) an estimate of the available vehicular computing resources for different geographic locations ($C_1, C_2, C_3 \ldots C_N$) and times of day [i.e., "option 1"]; or (2) a simple "yes" or "no" regarding whether a micro-vehicular cloud should be formed at this particular geographic location and time of day [i.e., "option 2"]. If the rule is in accordance with option (1), then the cloud client 198 determines whether to form a micro-vehicular cloud with other connected vehicles based on this estimate. If the rule is in accordance with option (2), then the cloud client 198 follows the rule when determining whether to form a micro-vehicular cloud with other connected vehicles.

Referring now to FIG. 1F, depicted is a block diagram illustrating a process flow 102 executed by a planner system 199 according to some embodiments.

The planner system 199 receives the resource data 195 for a geographic region as an input. The geographic region includes a plurality of geographic locations. The planner system 199 analyzes the resource data 195 to generate model data 152 for the plurality of geographic locations. The planner system 199 outputs the model data 152. In some embodiments, the planner system 199 stores the model data 152 in a non-transitory memory. The planner system 199 receives the model data 152 as an input. The planner system 199 analyzes the model data 152 to determine a set of rules for the plurality of geographic locations. The set of rules are described by rules data 154. The planner system 199 outputs the rules data 154 describing the set of rules. In some embodiments, the planner system 199 stores the rules data 154 in a non-transitory memory. The planner system receives the rules data 154 as an input and causes a communication unit of the non-vehicle node to transmit the rules data 154 to the first vehicle 123 (or the second vehicle 124) via the network 105. The cloud client 198 of the first vehicle 123 receives the rules data 154. The rules data 154 controls the operation of the cloud client 198 with regards to whether it forms or does not form a micro-vehicular cloud.

Figure 2:
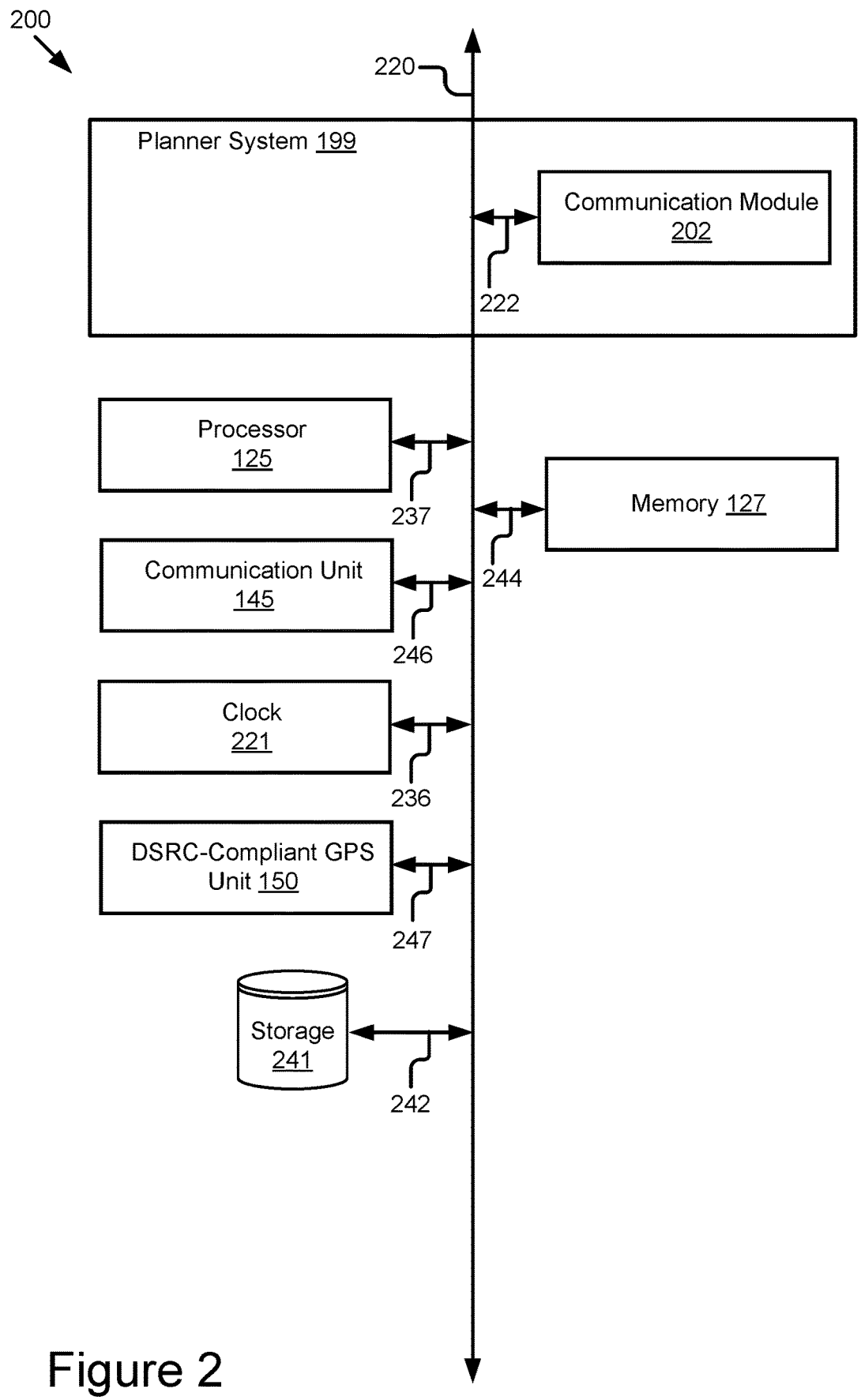
FIG. 2 is a block diagram illustrating an example computer system including a planner system according to some embodiments.

Referring now to FIG. 2, depicted is a block diagram illustrating an example computer system 200 including a planner system 199 according to some embodiments.

In some embodiments, the computer system 200 may include a special-purpose computer system that is programmed to perform one or more steps of the method 300 described below with reference to FIGS. 3A-3C.

In some embodiments, the computer system 200 may include a processor-based computing device. For example, the computer system 200 may include an onboard vehicle computer system of the first vehicle 123 or the second vehicle 124; the computer system 200 may also include an onboard computer system of the non-vehicle node 103.

The computer system 200 may include one or more of the following elements according to some examples: the planner system 199; a processor 125; a communication unit 145; a clock 221; a DSRC-compliant GPS unit 150; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The clock 221 is communicatively coupled to the bus 220 via a signal line 236. The DSRC-compliant GPS unit 150 is communicatively coupled to the bus 220 via a signal line 247. The storage 241 is communicatively coupled to the bus 220 via a signal line 242. The memory 127 is communicatively coupled to the bus 220 via a signal line 244.

The following elements of the computer system 200 were described above with reference to one or more of FIGS. 1A-1F, and so, these descriptions will not be repeated here: the processor 125; the communication unit 145; the DSRC-compliant GPS unit 150; and the memory 127.

The clock 221 includes a software, hardware or a combination of hardware and software that is configured to monitor the passage of time.

In some embodiments, the clocks 221 of a plurality of computer systems 200 are synchronized so that they each monitor the passage of time in synchronization with one another. In this way, for any point in time, the clock 221 of a first vehicle 123 and the clock 221 of a second vehicle 124 may each indicate the same time or substantially the same time.

The clock 221 generates timestamp data 176 that describes the time measured by the clock 221. The timestamp data 176 is stored on the memory 127. In some embodiments, the timestamp data 176 is an element of the GPS data 186 retrieved by the DSRC-compliant GPS unit 150.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the planner system 199 includes code and routines that are operable, when executed by the processor 125, to cause the processor 125 to execute one or more steps of the method 300 described below with reference to FIGS. 3A-3C.

In the illustrated embodiment shown in FIG. 2, the planner system 199 includes a communication module 202.

The communication module 202 can be software including routines for handling communications between the planner system 199 and other components of the computer system 200. In some embodiments, the communication module 202 can be a set of instructions executable by the processor 125 to provide the functionality described below for handling communications between the planner system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100 or the operating environment 101.

In some embodiments, the communication module 202 receives data from components of the planner system 199 and stores the data in one or more of the storage 241 and the memory 127.

In some embodiments, the communication module 202 may handle communications between components of the planner system 199 or the computer system 200.

Figure 3A:
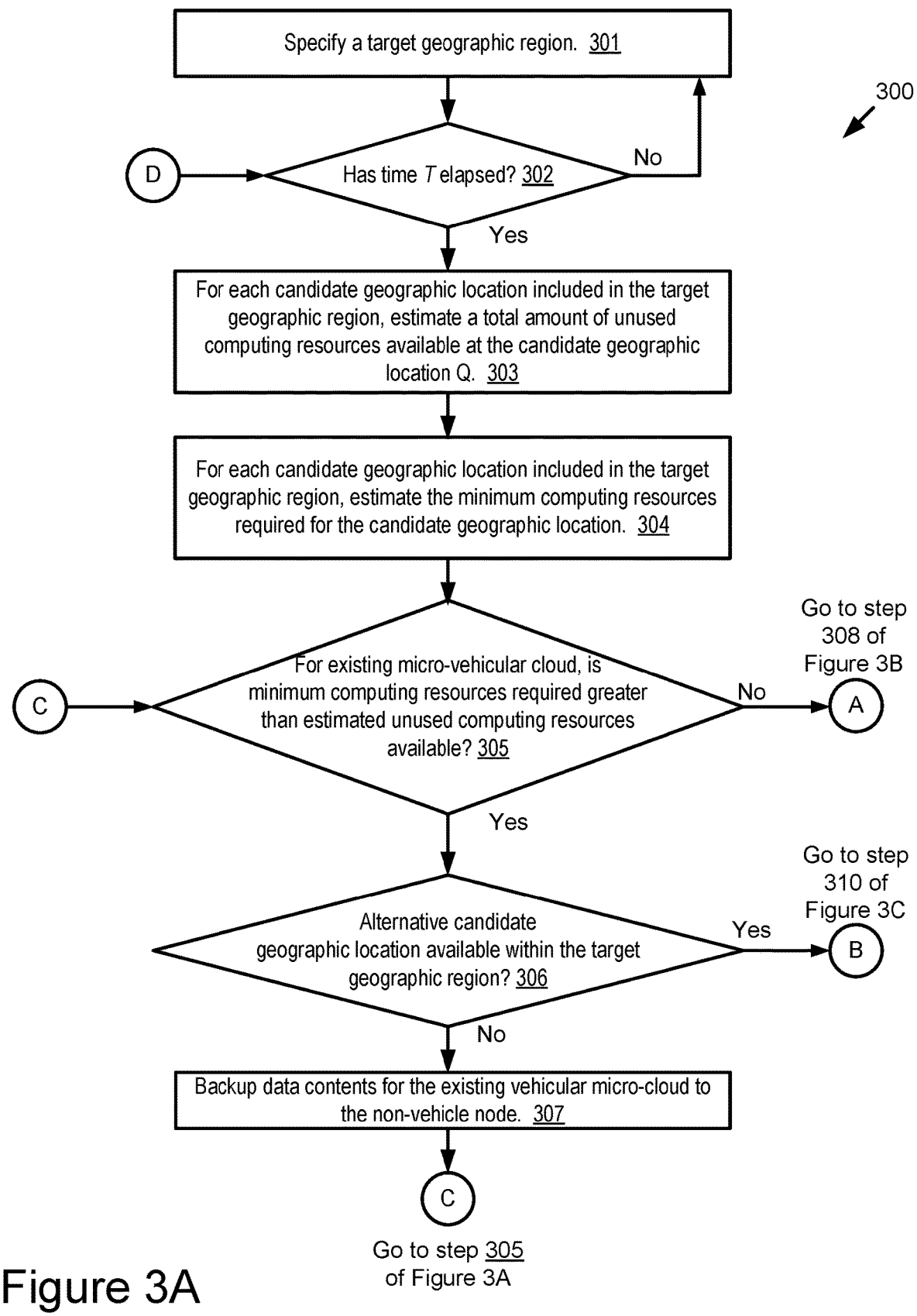
FIGS. 3A-3C are a flowchart of an example method for controlling a decision about whether to form a micro-vehicular cloud at a geographic location according to some embodiments.
Figure 3B:
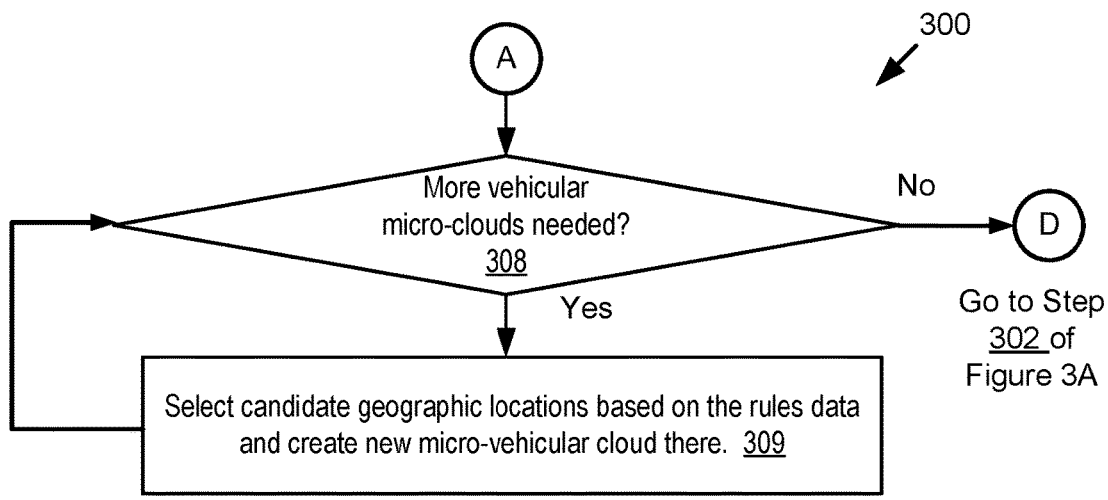
Figure 3C:
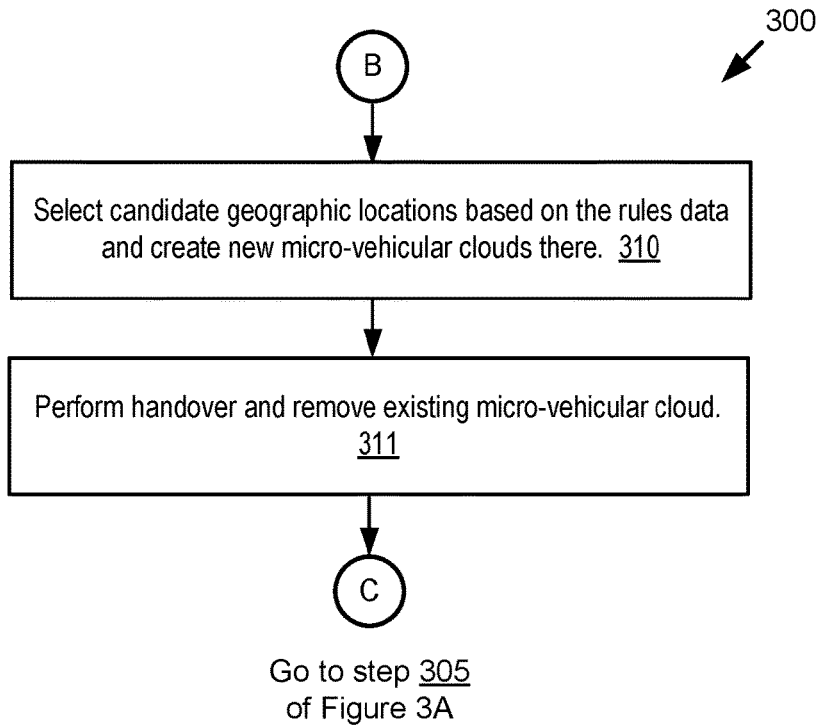

Referring now to FIGS. 3A-3C, depicted is a flowchart of an example method 300 for controlling a decision about whether to form a micro-vehicular cloud at a geographic location according to some embodiments. One or more steps of the method 300 may be executed by the computer system 200 described above with reference to FIG. 2.

Referring to FIG. 3A, at step 301 a target geographic region is specified. For example, a geographic area includes a plurality of geographic region from which the target geographic region is selected at step 301. The target geographic region includes a plurality of candidate geographic locations, each of which is a candidate for forming a micro-vehicular cloud. In some embodiments, each planner system manages a single geographic region such that step 301 is not needed and is an optional step of the method 300.

At step 302, a determination is made regarding whether a specified amount of time has elapsed since the last time the method 300 was executed for the target geographic region. Note that the specified amount of time is represented by an italicized T whereas the time depicted in FIG. 1E is depicted with an unitalicized T. If the specified amount of time has not elapsed, then the method returns to step 301. If the specified amount of time has elapsed, then the method 300 proceeds to step 303.

At step 303, for each candidate geographic location included in the target geographic region specified in step 301, an estimation is made which quantifies a total amount of unused computing resources available at the candidate geographic location. For example, the estimate for a particular candidate geographic location estimates the amount of unused computing resources available at the particular candidate geographic location if a micro-vehicular cloud is formed at this particular candidate geographic location.

In some embodiments, this step 303 is repeated for a series of different times. In some embodiments, the expected resource budget Q for each candidate geographic location is equal to the estimate of the total amount of unused computing resources available at a candidate geographic location, i.e., the Y-axis of the graphs depicted in FIG. 1E.

At step 304, for each candidate geographic location included in the target geographic region, an estimate is made that quantifies the minimum computing resources required for the vehicles present within the geographic location.

One or more of the candidate geographic locations already has a micro-vehicular cloud formed at their geographic location, i.e., an "existing micro-vehicular cloud." At step 304, a determination is made regarding whether the minimum computing resources required for the existing micro-vehicular cloud is greater than the estimated unused computing resources for the candidate geographic location which has the existing micro-vehicular cloud during the next time period (i.e., the specified amount of time, T). If the determination is "yes," then the method 300 proceeds to step 308 of FIG. 3B. If the determination is "no," then the method 300 proceeds to step 306.

At step 306, a determination is made regarding whether an alternative candidate geographic location is available within the target geographic region. If an alternative is available, then the method 300 proceeds to step 310 of FIG. 3C. If an alternative is not available, then the method 300 proceeds to step 307.

At step 307, the digital data stored by the computing resources within the existing micro-vehicular cloud on behalf of the members of the existing micro-vehicular cloud are backed up to the memory 127 of the non-vehicle node 103 via the network 105. The method 300 then proceeds to step 305.

Referring now to FIG. 3B, at step 308 a determination is made regarding whether more micro-vehicular clouds are needed for this target geographic region. If the determination at step 308 is that more micro-vehicular clouds are not needed, then the method 300 proceeds to step 302 of FIG. 3A. If the determination at step 308 is that more micro-vehicular clouds are needed, then the method 300 proceeds to step 309.

At step 309, a candidate geographic location is selected based on the rules data and a new micro-vehicular cloud is formed for the selected candidate geographic location.

Referring now to FIG. 3C, at step 310 a candidate geographic location is selected based on the rules data and a new micro-vehicular cloud is formed for the selected candidate geographic location.

At step 311, a handover of the digital data stored for the existing micro-vehicular cloud on behalf of its members is performed so that the computing resources of the new micro-vehicular cloud stores this digital data.

Figure 4:
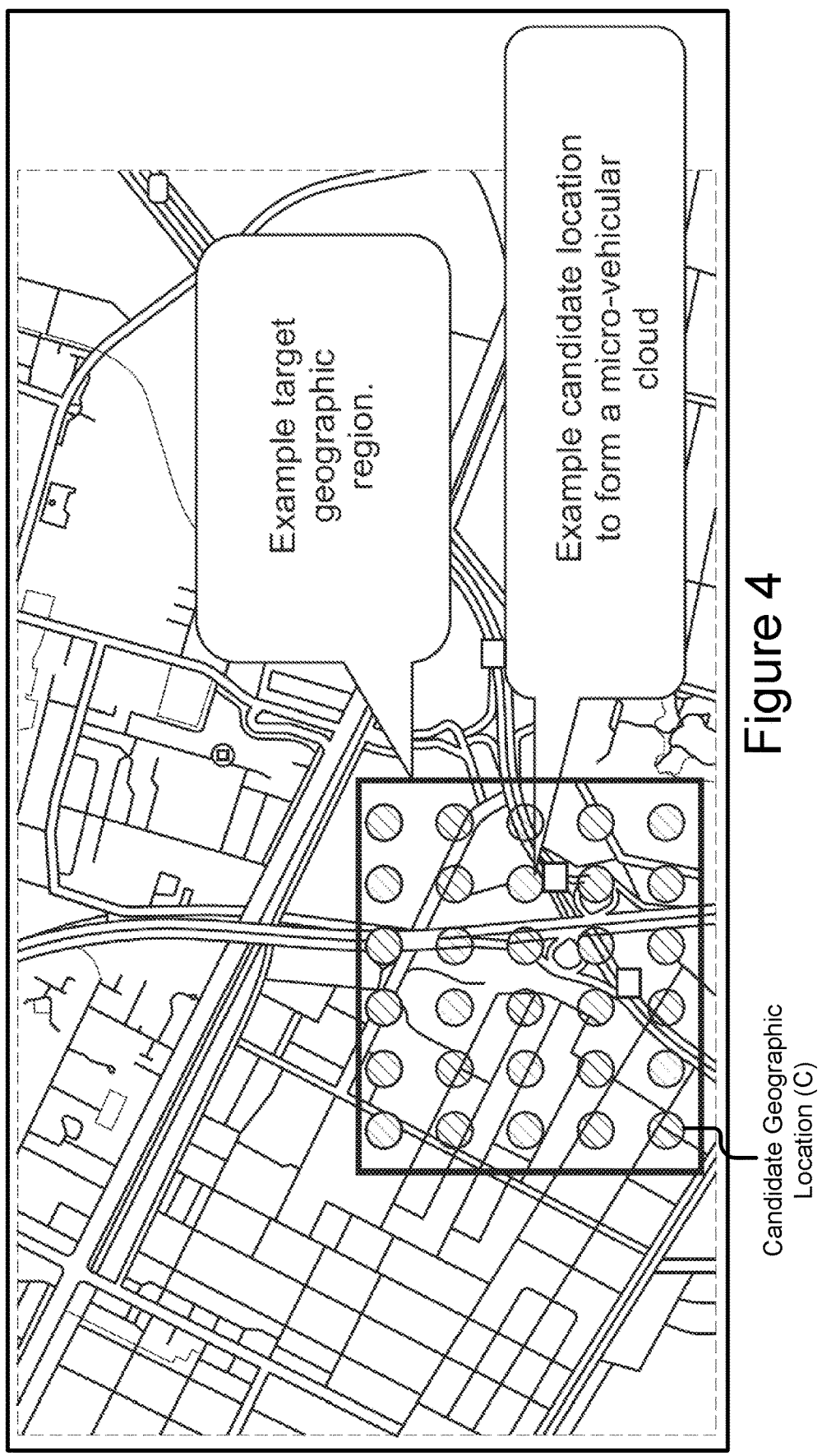
FIG. 4 is a block diagram illustrating an example of target geographic region and a plurality of candidate geographic locations within the target geographic region according to some embodiments.

Referring now to FIG. 4, depicted is a block diagram illustrating an example of target geographic region and a plurality of candidate geographic locations within the target geographic region according to some embodiments.

In some embodiments, the planner system 199 analyzes the resource data set 196 to identify a set of candidate geographic locations. These candidate geographic locations are candidates for forming a micro-vehicular cloud. For the purpose of explanation, assume that each candidate geographic location has a radius D. However, in practice, other shapes can be specified to define micro-vehicular clouds. For each specified time frame with the duration of T seconds, the planner system 199 selects the designated number of candidate geographic locations and instructs connected vehicles there which include the cloud client 198 to form micro-vehicular clouds. FIG. 4 is referred to below with reference to the description for FIG. 5.

Figure 5:
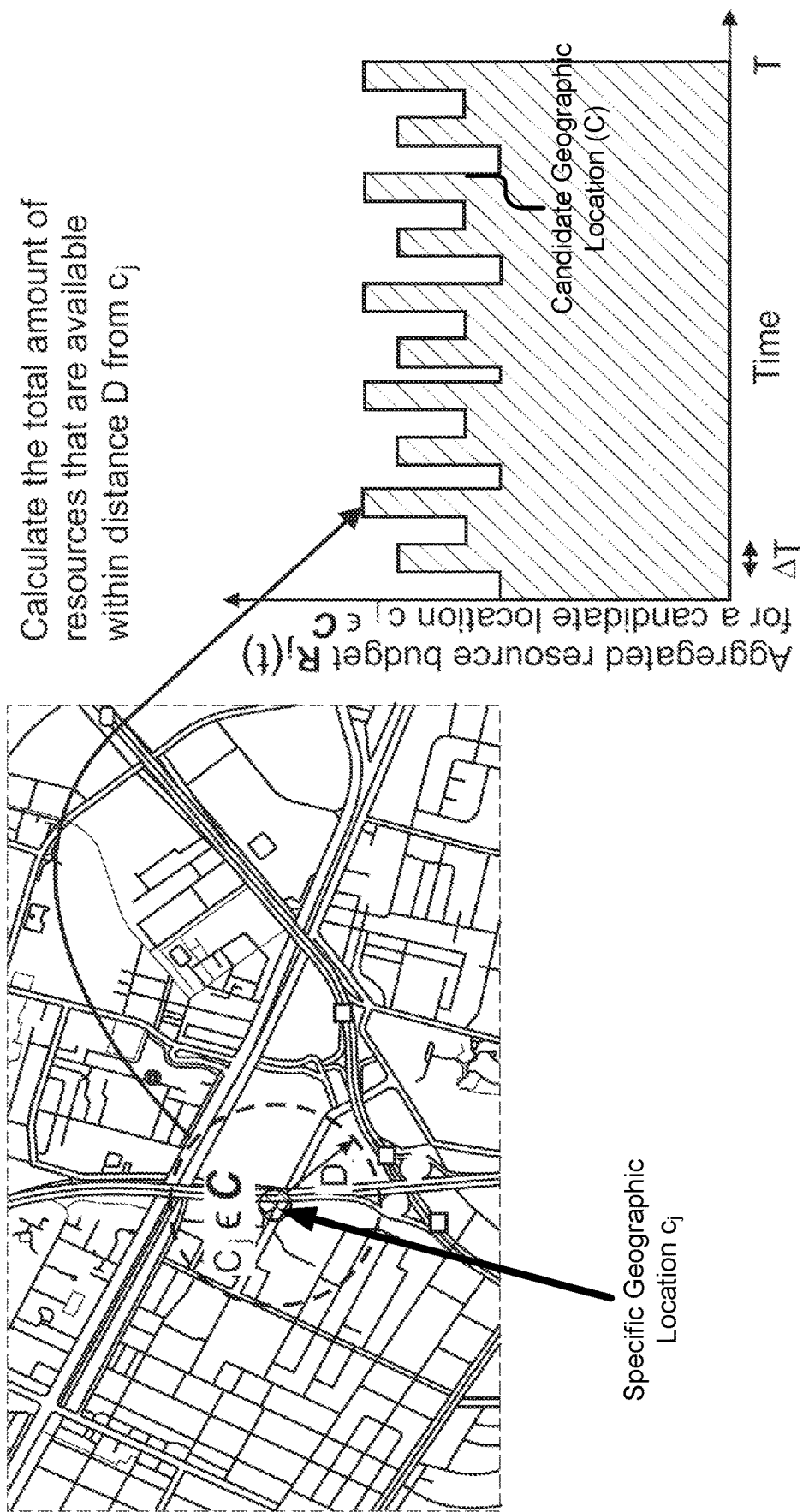
FIG. 5 is a block diagram illustrating an analysis to form model data and rules data for one a candidate geographic location according to some embodiments.

Referring FIG. 5, depicted is a block diagram illustrating an analysis to form model data and rules data for one a candidate geographic location according to some embodiments.

In some embodiments, FIG. 5 depicts analysis of the resource data for each candidate geographic location depicted in FIG. 4. For example, the resource data is geo-stamped, and so, the planner system cross references the geographic location for each candidate geographic location against the geo-stamps within the resource data set to identify the resource data for each particular candidate geographic location.

In some embodiments, given a set of resource data over a time frame of T seconds, the planner system includes code and routines that are operable, when executed by a processor, to cause the processor to calculate a time series of the total amount of unused computing resources $R_j(t)$ that are available within the distance D from each candidate geographic location $c_j \epsilon C$ as depicted in FIG. 5.

In some embodiments, the planner system includes code and routines that are operable, when executed by a processor, to cause the processor to calculate the q-percentile value of the aggregated resource budgets, say $Q_{jk}$, to characterize the amount of resources that are available at $c_j$ during the time frame k. The parameter q is typically assigned a small value (e.g., 30%) to conservatively evaluate the availability of unused computing resources. Given the aggregated resource budgets $Q_{jk}$ for all the candidate geographic locations $c_j \epsilon C$ and all the past time frames k, the planner system is operable to cause the processor to construct a prediction model to estimate the resource budgets $Q_{jk'}$ for the future time frames k'. This prediction model is described by the model data.

In some embodiments, as a result of resource budget forecasting, the planner system includes code and routines that are operable, when executed by a processor, to cause the processor to obtain a time series of the estimated amount of resources that are available at each candidate geographic location. These estimations are described by the rules data.

Figure 6:
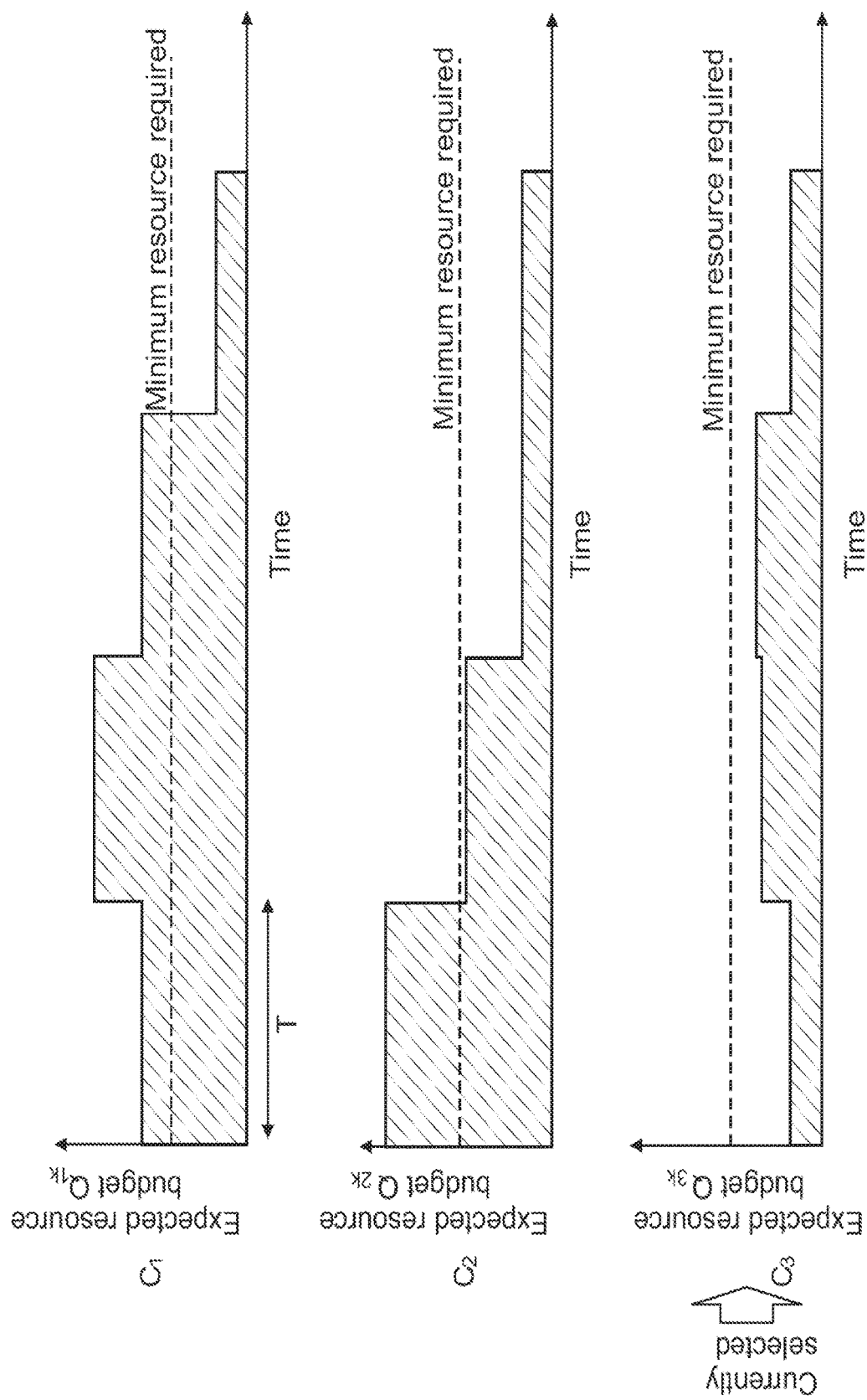
FIG. 6 is a block diagram illustrating an analysis of model data according to some embodiments.

Referring now to FIG. 6, depicted is a block diagram illustrating an analysis of model data according to some embodiments.

Assume that the planner system currently selects the candidate geographic location $C_3$. However, the resource budget of the stationary micro-vehicular cloud at $C_3$ is expected to become lower than the minimum amount of resource required in the next time frame, so it needs to form another stationary micro-vehicular cloud at different location and perform handover.

A variety of selection policies are applicable to choose an alternative location to form a stationary micro-vehicular cloud. The following are some example policies for selecting a new location.

In some embodiments, the selection policy includes a "Highest Resource First" policy which includes selecting a candidate geographic location whose expected unused computing resources in the next time frame is highest. As applied to FIG. 6, the candidate geographic location $C_2$ is selected as an alternative candidate geographic location, or as a candidate geographic location where a micro-vehicular cloud should be formed.

In some embodiments, the selection policy includes a "Longest Lifetime First" policy which includes selecting a candidate geographic location whose expected unused computing resources exceeds the minimum value for the longest time. As applied to FIG. 6, the candidate geographic location $C_1$ is selected as an alternative.

In some embodiments, the selection policy includes a "Farthest Location First" policy which includes selecting a candidate geographic location whose unused computing resources in the next time frame exceeds the minimum value and whose average distance from other stationary micro-vehicular clouds is largest.

In some embodiments, one or more of the selection policies are combined to form a different selection policy.

In some embodiments, if the planner system decides to perform a handover, and has successfully found an alternative geographic location C' to form a new micro-vehicular cloud that replaces an old micro-vehicular cloud C, then the planner system includes code and routines to cause the processor to execute one or more of the following steps responsive to executing the planner system: generating rules data describing an instruction to form a micro-vehicular cloud at the alternative geographic location C'; and transmitting the rules data to the individual connected vehicles. The alternative geographic location C' includes a center having a specific geographic location c'. The individual connected vehicles within a distance D from the specific geographic location c' form a micro-vehicular cloud. Both c' and D are described by the rules data. Here, in this example, the alternative geographic location C' is a circular area within a circumference located a distance D from a specific geographic location c'. The planner system includes code and routines that are operable, when executed by the processor, to cause the processor to instruct the vehicles in the existing micro-vehicular cloud to transfer all their digital data contents to the new micro-vehicular cloud located at C'. This digital data can be transferred via the non-vehicle node 103, or over vehicle-to-vehicle networks. Once the data transfer is completed, the planner system removes the old geographic location C from the rules data of individual vehicles to formally disband the old micro-vehicular cloud.

In some embodiments, if the planner system decides to perform handover, but failed to find an alternative geographic location C', then the planner system includes code and routines to cause the processor to execute one or more of the following steps responsive to executing the planner system: cause the edge server to collect the data contents that are kept in the old micro-vehicular cloud to avoid data loss; once the data transfer is completed, remove the old geographic location C from the rules data of individual vehicles to formally disband the old micro-vehicular cloud; continue monitoring resource data to find an appropriate geographic location to form a new micro-vehicular cloud; and restore the data contents to the new micro-vehicular cloud when the new vehicular-micro cloud is formed.

In some embodiments, the planner system uses long-term and wide-scale statistics on resource availability to reliably predict the locations, where vehicle-provided resources are expected to be available for the whole lifetime of a micro stationary micro-vehicular cloud; this improves stability of stationary micro stationary micro-vehicular clouds, reducing the risk of data loss and the overhead for handovers.

In some embodiments, the planner system can be operated in a distributed manner by edge servers, as they optimize the placement of micro stationary micro-vehicular clouds based on the resource data that are collected from vehicles in a local geographical region. This helps to reduce the communication overhead in the core network and resource consumption at data centers.

Referring now to FIG. 7A, depicted is a block diagram illustrating BSM data 795 according to some embodiments. In some embodiments, BSM messages, and the BSM data they contain, are used by the cloud client 198 to identify nearby vehicles which can join the micro-vehicular cloud that it decides to form based on the rules data.

In some embodiments, one or more vehicles of a vehicle set (e.g., the first vehicle, the second vehicle, the Nth vehicle, etc.) may transmit a DSRC message. The DSRC message may include one or more of a conventional DSRC message, a DSRC probe, or Basic Safety Message ("BSM message" if singular, or "BSM messages" if plural).

The regular interval for transmitting BSM messages is user configurable. In some implementations, a default setting for this interval is transmitting the BSM message is every 0.10 seconds or substantially every 0.10 seconds. A BSM message is broadcasted over the 5.9 GHz DSRC band. In some embodiments, the DSRC radio of the communication unit includes seven bands for transmitting and receiving DSRC messages, with one of these bands being reserved exclusively for transmitting and receiving BSM messages.

The range for transmitting DSRC messages such as BSM messages is substantially 1,000 meters. In some implementations, DSRC range is a range of substantially 100 meters to substantially 1,000 meters.

Referring now to FIG. 7B, depicted is a block diagram illustrating BSM data 795 according to some embodiments. In some embodiments, each BSM message includes all of the information depicted in FIG. 7B for the BSM data 795 and no other information.

A BSM message may include two parts. These two parts may include different BSM data 795 as shown in FIG. 7B.

Part 1 of the BSM data 795 describes the following: vehicle position; vehicle heading; vehicle speed; vehicle acceleration; vehicle steering wheel angle; and vehicle size.

Part 2 of the BSM data 795 includes a variable set of data elements drawn from a list of optional elements. Some of the BSM data 795 included in Part 2 of the DSRC message are selected based on event triggers, e.g., anti-locking brake system ("ABS") being activated may trigger BSM data 795 relevant to the ABS system of the vehicle.

In some implementations, some of the elements of Part 2 are transmitted less frequently in order to conserve bandwidth.

In some implementations, the BSM data 795 included in a BSM message includes current snapshots (i.e., photographs) of a vehicle traveling along a roadway system.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A system comprising:
   a non-vehicle node including a communication unit which is operable to wirelessly receive a plurality of instances of resource data from a plurality of connected vehicles, wherein the plurality of instances of resource data describe unused computing resources of the plurality of connected vehicles while present at an existing geographic location; and
   a processor communicatively coupled to the communication unit, wherein the processor is operable to execute computer code that causes the processor to:
   analyze the plurality of instances of resource data to determine rules data describing that a new micro-vehicular cloud should be formed at a new geographic location; and
   cause the communication unit to wirelessly transmit the rules data to a particular connected vehicle, wherein the rules data is operable to instruct the particular connected vehicle to form the new micro-vehicular cloud at the new geographic location and to instruct the particular connected vehicle to transfer digital data content items to the new micro-vehicular cloud, wherein the new micro-vehicular cloud replaces an existing micro-vehicular cloud at the existing geographic location.

2. The system of claim 1, wherein the computer code is further operable to, responsive to the digital data content items being transferred to the new micro-vehicular cloud, remove the existing geographic location from the rules data to disband the existing micro-vehicular cloud.

3. The system of claim 1, wherein the rules data instructs the particular connected vehicle to form the new micro-vehicular cloud at the new geographic location responsive to determining that the unused computing resources available at the existing geographic location fall below a minimum amount of resource required in a next time frame.

4. The system of claim 1, wherein the non-vehicle node is located in a geographic region that includes the new geographic location.

5. The system of claim 1, wherein the rules data describes an estimate of unused computing resources available at the new geographic location at a plurality of different times and the rules data is operable to control whether the particular connected vehicle forms the new micro-vehicular cloud at the new geographic location based on a current time.

6. The system of claim 1, wherein the particular connected vehicle includes an onboard unit having a cloud client that analyzes the rules data to determine whether to form the new micro-vehicular cloud at the new geographic location based on a current time.

7. The system of claim 1, wherein the plurality of instances of resource data are transmitted via a 5.9 gigahertz band and the communication unit includes an electronic receiver which is operable to receive a plurality of wireless messages including the plurality of instances of resource data via the 5.9 gigahertz band.

8. The system of claim 7, wherein the plurality of wireless messages are Dedicated Short Range Communication messages.

9. The system of claim 1, wherein the plurality of instances of resource data describes the new geographic location of the plurality of connected vehicles with an accuracy of plus or minus 1.5 meters in all directions.

10. A method for controlling whether a particular connected vehicle forms a new micro-vehicular cloud at a new geographic location based on a current time of the particular connected vehicle, the method comprising:
    receiving a plurality of instances of resource data from a plurality of connected vehicles, wherein the plurality of instances of resource data describe unused computing resources of the plurality of connected vehicles while present at an existing geographic location;
    analyzing the plurality of instances of resource data to determine rules data describing that a new micro-vehicular cloud should be formed at a new geographic location; and
    transmitting the rules data to the particular connected vehicle, wherein the rules data is operable to instruct the particular connected vehicle to form the new micro-vehicular cloud at the new geographic location and to instruct the particular connected vehicle to transfer digital data content items to the new micro-vehicular cloud, wherein the new micro-vehicular cloud replaces an existing micro-vehicular cloud at the existing geographic location.

11. The method of claim 10, wherein, responsive to the digital data content items being transferred to the new micro-vehicular cloud, removing the existing geographic location from the rules data to disband the existing micro-vehicular cloud.

12. The method of claim 10, wherein the method is executed by an edge server or a cloud server.

13. The method of claim 10, wherein the rules data instructs the particular connected vehicle to form the new micro-vehicular cloud at the new geographic location responsive to determining that the unused computing resources available at the existing geographic location fall below a minimum amount of resource required in a next time frame.

14. The method of claim 10, wherein the rules data describes an estimate of unused computing resources available at the existing geographic location at a plurality of different times.

15. The method of claim 10, wherein the particular connected vehicle includes an onboard unit having a cloud client that analyzes the rules data to determine whether to form the new micro-vehicular cloud at the new geographic location based on a current time.

16. A computer program product comprising a non-transitory memory storing computer-executable code that, when executed by a processor, causes the processor to:
   receive a plurality of instances of resource data from a plurality of connected vehicles, wherein the plurality of instances of resource data describe unused computing resources of the plurality of connected vehicles while present at an existing geographic location;
   analyze the plurality of instances of resource data to determine rules data describing that a new micro-vehicular cloud should be formed at a new geographic location; and
   transmit the rules data to a particular connected vehicle, wherein the rules data is operable to instruct the particular connected vehicle to form the new micro-vehicular cloud at the new geographic location and to instruct the particular connected vehicle to transfer digital data content items to the new micro-vehicular cloud, wherein the new micro-vehicular cloud replaces an existing micro-vehicular cloud at the existing geographic location.

17. The computer program product of claim 16, wherein, responsive to the digital data content items being transferred to the new micro-vehicular cloud, removing the existing geographic location from the rules data to disband the existing micro-vehicular cloud.

18. The computer program product of claim 16, wherein the processor is an element of an edge server or a cloud server.

19. The computer program product of claim 16, wherein the rules data instructs the particular connected vehicle to form the new micro-vehicular cloud at the new geographic location responsive to determining that the unused computing resources available at the existing geographic location fall below a minimum amount of resource required in a next time frame.

20. The computer program product of claim 16, wherein the rules data describes an estimate of unused computing resources available at the new geographic location at a plurality of different times.

21. The computer program product of claim 16, wherein the particular connected vehicle includes an onboard unit having a cloud client that analyzes the rules data to determine whether to form the micro-vehicular cloud at the new geographic location based on a current time.

* * * * *